United States Patent [19]
Friedrich et al.

[11] Patent Number: 5,692,544
[45] Date of Patent: Dec. 2, 1997

[54] SEAL AND CLAMP ASSEMBLY FOR PIPELINE FLANGED CONNECTION

[75] Inventors: Jaromir Friedrich; Bronislav Walter, both of Edmonton, Canada

[73] Assignee: International Pipeline, Inc., Edmonton, Canada

[21] Appl. No.: 400,358

[22] Filed: Mar. 8, 1995

[51] Int. Cl.⁶ .............................................. F16L 55/178
[52] U.S. Cl. ..................... 138/99; 138/109; 138/161; 138/164; 285/15; 285/420
[58] Field of Search .................... 138/99, 106, 109, 138/110, 158, 159, 161, 164; 285/15, 419, 420

[56] References Cited

U.S. PATENT DOCUMENTS

| | | | |
|---|---|---|---|
| 144,997 | 11/1873 | Mayall | 285/420 |
| 194,697 | 8/1877 | Logan | 138/99 |
| 518,805 | 4/1894 | Cooper | 138/99 |
| 549,594 | 11/1895 | Cooper et al. | 138/99 |
| 1,883,086 | 10/1932 | Swartz | 138/109 |
| 2,417,741 | 3/1947 | Dillon | 138/99 |
| 3,042,430 | 7/1962 | Guy | 285/420 |
| 3,214,202 | 10/1965 | Maychark | 285/400 |
| 3,228,096 | 1/1966 | Albro | 138/109 |
| 4,111,234 | 9/1978 | Wells et al. | 138/99 |
| 4,652,023 | 3/1987 | Timmons | 138/99 |
| 4,657,284 | 4/1987 | Fiori | 285/420 |
| 4,927,181 | 5/1990 | Ciotola | 138/99 |
| 5,012,842 | 5/1991 | Savard | 138/99 |
| 5,121,946 | 6/1992 | Jardine | 285/15 |
| 5,123,451 | 6/1992 | Savard . | |
| 5,375,888 | 12/1994 | Ikeda | 138/99 |
| 5,383,496 | 1/1995 | Bridges et al. | 138/99 |

Primary Examiner—David Scherbel
Assistant Examiner—James F. Hook
Attorney, Agent, or Firm—Dennis T. Griggs

[57] ABSTRACT

The assembly is designed to contain a leak arising from a damaged gasket positioned between the flanges of a pipe connection forming part of a pipeline carrying pressurized fluid. The assembly comprises a pair of steel half rings that are hinged together at one end so that they can be mounted to the connection in the form of a split ring. Each half ring contains an elongate seal element having an annular configuration. The ends of the half rings are lapped so that the split ring can be contracted with the ring ends overlapping. A chain and clamp assembly is tightened around the split ring to compress the seal elements into sealing engagement with the flanges. Shoulders formed by the half rings squeeze the abutting seal element ends together to effect a seal at the split ring breaks.

5 Claims, 10 Drawing Sheets

SEAL AND CLAMP ASSEMBLY FOR PIPELINE FLANGED CONNECTION

FIELD OF THE INVENTION

This invention relates to a seal and clamp assembly for sealing a flanged connection whose gasket is leaking.

BACKGROUND OF THE INVENTION

The present invention was developed to temporarily seal a flanged connection joining two pipe ends. The flanged connection forms part of a pipeline carrying fluid under pressure, such as natural gas or oil.

There are many such connections along the length of a pipeline and it is not uncommon for the gasket of one of them to fail and begin leaking.

Heretofore, the normal practice for repairing such a leak has first of all involved isolating the segment of line containing the connection. This would be done by closing upstream and downstream valves at each end of the segment. Then the connection would be dismantled and the gasket would be replaced.

This repair procedure requires that the flow of fluid through the line must be temporarily suspended. This is an undesirable requirement.

It would be advantageous if the leaking connection could be temporarily externally sealed and contained with a suitable, easily applied assembly. Replacement of the gasket could then be postponed to a more convenient time, such as that of a scheduled maintenance shut-down of the pipeline.

The present invention is directed to providing such an assembly.

The new assembly incorporates some features of a known pipeline repair sleeve assembly. This known assembly was designed for repairing a small hole in the pipe wall. The assembly was disclosed in U.S. Pat. No. 5,123,451, issued to Donald Savard.

The Savard assembly comprises a pair of semi-circular steel shells. The inner surface of one shell forms a central, circular recess. A flat, cylindrical, annular seal element is seated in the recess. It closely fits the recess, so that it is supported and contained along its top and side surfaces by the recess walls. The seal element protrudes inwardly a small amount beyond the inner surface of the shell containing it. When used, the shell carrying the seal element is mounted to the pipe so that the seal element encircles the leakage site. The other shell is also applied to the pipe. The resulting split sleeve almost entirely encircles the pipe. A belt-like chain and clamp assembly is then positioned around the shells and cinched up to tightly clamp them to the pipe to create steel-on-steel contact. The ends slide together during clamping. These ends are then welded together longitudinally and the sleeve ends are welded circumferentially to form a permanent pressure vessel encapsulating the leaking pipe segment. The chain and clamp assembly is then removed.

When the sleeve has been formed in this manner, the protruding seal element is compressed into sealing engagement with the pipe surface. The pipeline's internal pressure acts against the radial inner surface of the seal element opening and further compresses the seal element into sealing engagement with the rigid containing surfaces of the shell and pipe. As the seal element is flat, broad and thick, its considerable volume cannot be easily extruded through any slight clearance between the shell and pipe.

SUMMARY OF THE INVENTION

In accordance with the present invention, a seal and clamp assembly is provided for temporarily sealing and containing a flanged connection whose gasket is leaking. The assembly involves the following:

A pair of rigid half rings are provided having means for connecting them together at their ends to form a split ring having two breaks;

Each half ring has lapped ends. At one end, the inner portion of the half ring wall is cut back to form an inner recess and an outer protruding segment. At the other end, the outer portion of the half ring wall is cut back to form an outer recess and an inner protruding segment. When the two half rings are assembled, the inner recess of one half ring receives or is associated with the inner protruding segment of the other half ring. The shoulder end face at the inner end of the inner recess of one half ring and the end face of the inner protruding segment of the other half ring, provide radial squeezing surfaces at each break for a purpose to be described;

The inner surface of each half ring forms an inwardly opening, central channel, of rectangular cross-section, extending longitudinally thereof;

A pair of flexible and resilient seal elements are provided, one for each ring half. Each seal element takes the form of an annular, flat, elongate rectangle, having a central rectangular opening. Stated otherwise, the seal element incorporates a pair of coextensive, parallel, spaced apart side members and a pair of transverse end members. One of the end members extends outwardly beyond the side members, to form protruding lugs. This end of the seal element can be described as having a double T-like shape (i.e. "TT");

A seal element is seated in the channel of each half ring. The double T-like end seats in and fills the inner recess of the half ring. The top and outer radial surfaces of the seal element have a close fit with the channel, so as to be supported and contained by the channel walls. The inner radial surfaces of the seal element are open to the pressure originating from the leak. The seal element is thicker than the channel is deep and protrudes inwardly therefrom;

Preferably a hinge assembly is provided for connecting and hinging one pair of half ring ends, said assembly being constructed so as to enable the ring to contract a limited amount; and Preferably a latch assembly is provided for connecting the other pair of half ring ends, said latch assembly being adapted to complete securing the hinged half rings together.

In use, each half ring is fitted with a seal element which is seated in the channel. The hinged together half rings are then mounted to the opposed flanges of the connection. The openings in the seal elements are positioned directly over the leaking gasket. The side members of the seal elements engage the surfaces of the two flanges. The latch assembly is engaged to form a loose split ring. A belt-like chain is positioned about the half rings and is cinched tight with a cinching or clamp device. As a result, the side members are pressed inwardly to seal against the flanges. As a further result, the inner radial squeeze circumferential surfaces of the half ring ends, at each break, cooperate, as the lapped ends slide together in overlapping fashion, to squeeze together the seal element's lug ends to effect a seal at the breaks. Pressure from the leak acts against the inner radial surfaces of the seal elements, to deform the side members so that they press harder against the flange circumferential surfaces.

The belt-like chain can be locked in place and the cinched-up seal and clamp assembly can be left in place until the gasket is to be replaced. The assembly can then be quickly removed.

The seal and clamp assembly is characterized by the following features:

The use of a split ring enables a quickly mounted, properly conforming rigid jacket to be used. However, the split ring has to be adequately sealed at the breaks to contain the internal pressure of the pipeline fluid. The provision of the double-T end of the seal element, in conjunction with the squeeze surfaces of the lapped ends of the half rings, enables this objective to be met;

The protruding nature of the seal elements, in conjunction with the overlapping, adjustable nature of the half ring ends, enables the seal and clamp assembly to fit itself to the flanges in sealing engagement, even though the flanges may be misaligned; and The pressure of leaking fluid acts against the inner radial surfaces of the seal element's central opening only serves to cause the element to seal better.

DESCRIPTION OF THE PREFERRED EMBODIMENT

Figure 1:
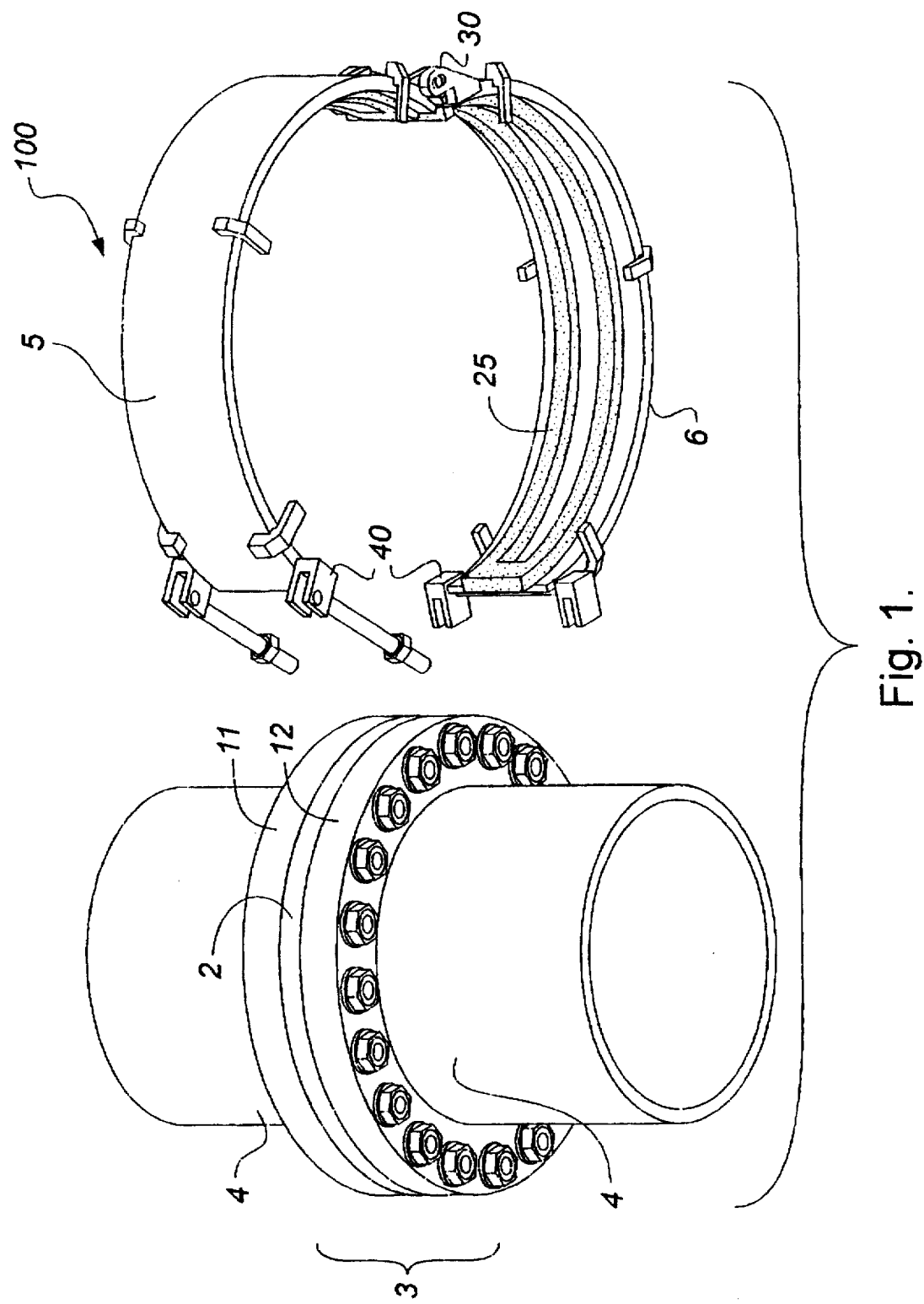
FIG. 1 is a perspective view showing the seal and clamp assembly being applied to the flanged connection.
Figure 2:
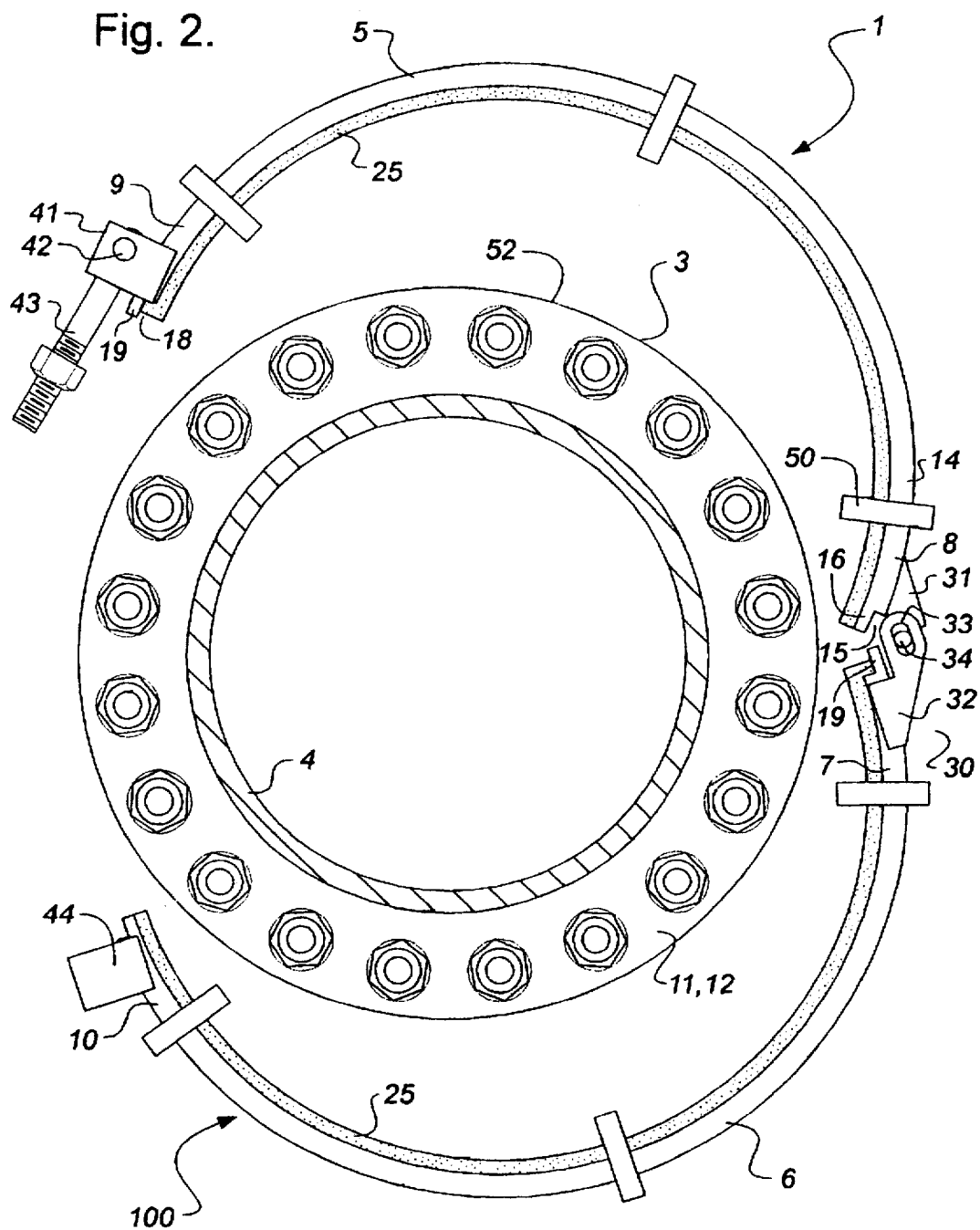
FIG. 2 is an end view similar to FIG. 1.
Figure 3:
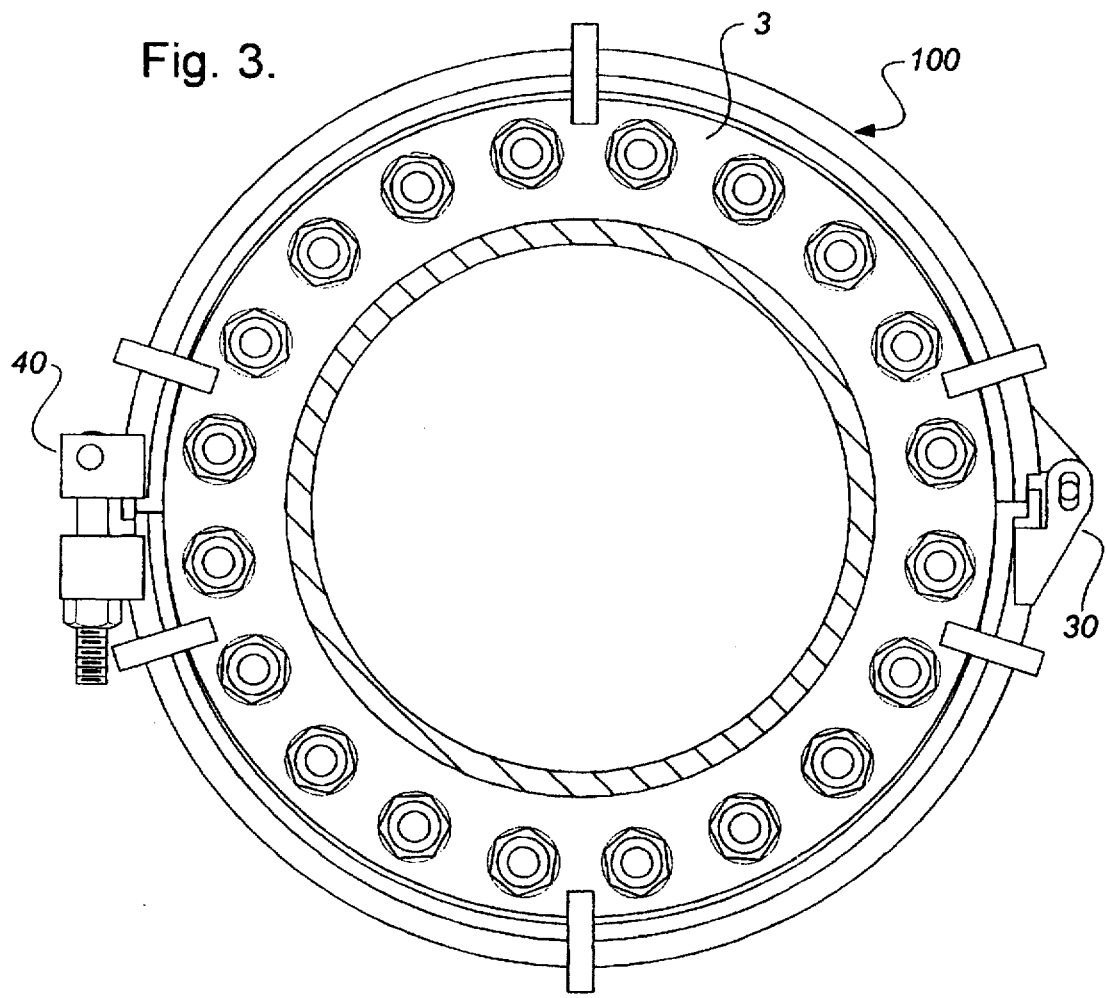
FIG. 3 is an end view showing the half rings connected together at their ends to form a loose split ring mounted on the flanged connection.
Figure 4:
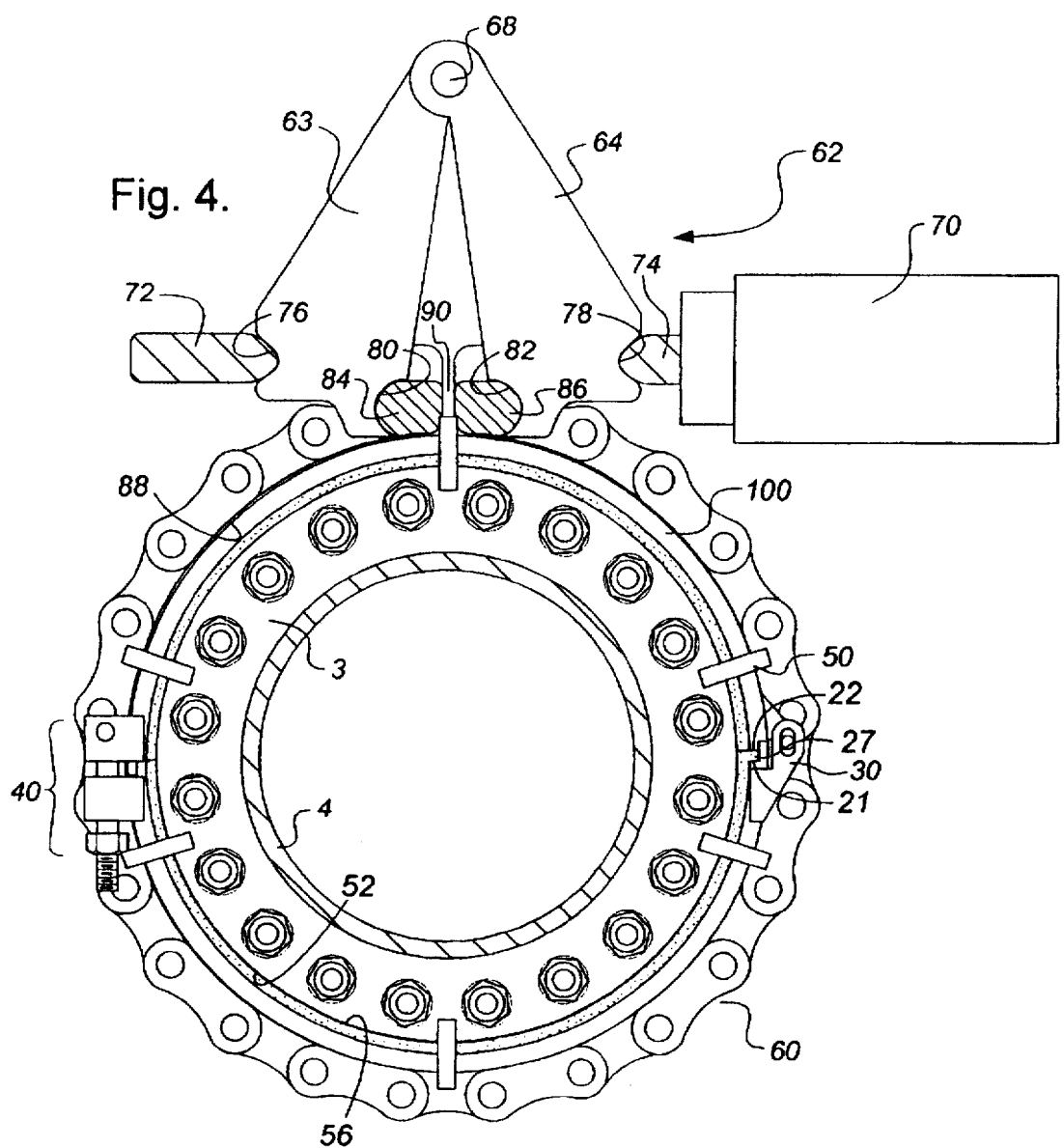
FIG. 4 is an end view showing the split ring clamped in the operative position on the flanged connection by a belt-like chain and clamp assembly.

The present invention relates to a seal and clamp assembly 1. The assembly is used to temporarily enclose and seal the leaking gasket 2 of a flanged connection 3.

The flanged connection 3 connects a pair of pipe ends 4 and forms part of a pipeline system carrying fluid under pressure.

The assembly 1 comprises a pair of rigid half rings 5,6. These half rings are hinged together at one pair of ends 7,8 and can be fastened together at the other pair of ends 9, 10 to form a split ring 100 which closely encircles the flanges 11, 12 of the connection 3.

Each half ring is semi-circular in configuration. At one end, the outer portion 14 of each half ring is cut back to form an outer recess 15 and an inner protruding segment 16. At its other end, the inner portion 17 of the half ring is cut back to form an inner recess 18 and an outer protruding segment 19. The inner recess 18 is bounded at its end by a transverse shoulder 20 having a radial end face 21. The inner protruding segment 16 has a radial end face 22.

The half rings 5,6 are assembled together so that each pair of associated half ring ends 7,8 and 9,10 has one end with an inner recess 18 and the other end with an outer recess 15. Thus, for each associated pair of ends, the protruding segments 16, 19 overlap in sliding engagement.

The internal surface 23 of each half ring is formed to provide an internal channel 24 which extends centrally and longitudinally thereof. The channel 24 has a rectangular cross-section bounded by laterally spaced apart side walls 102.

A pair of resilient, flexible seal elements 25 are provided, one to be used with each ring half.

Each seal element 25 comprises a pair of parallel, spaced apart, coextensive side members 26 joined at their ends by transverse end members 27, 28. The seal element 25 therefore has an annular form and defines a central opening 54. One end member 27 extends laterally beyond the side members 26 to form protruding lugs 29. This end of the seal element can be described as having a "double T" shape.

Each seal element 25 is dimensioned to extend the full length of the half ring with which it is associated. It snugly fits in the channel 24 so that its outer surface 57 and side surfaces are supported and contained by the solid surfaces of the channel. The seal element 25 is of sufficient thickness so that its inner surface 56 protrudes inwardly from the shell's internal surface 23.

The transverse end member 27 of each seal element 25 is disposed in the inner recess 18 of its associated half ring. Thus, when the two half rings 5,6 are assembled, each transverse end member 27 is bracketed by the recess radial end face 21 of one half ring and the protruding segment radial end face 22 of the other half ring.

A hinge assembly 30 is provided for hinging and connecting the two half rings 5,6 together at one pair of ends 7,8. More particularly, a pair of laterally spaced apart bosses 31 protrude radially from the outer surface of one ring half. A pair of laterally spaced apart bosses 32 protrude radially from the side surfaces of the other ring half and bracket the bosses 31. The bosses 32 each form a slot 33 extending longitudinally along the main plane of the split ring 100. Each boss 31 carries a laterally extending pin 34 which slides in the adjacent slot 33. The hinge assembly 30 thus enables the two lapped ring halves 5,6 to move together to contract the split ring 100 a limited amount, while still remaining operative to hinge and connect them together.

A latch assembly 40 is provided for fastening the ring half ends 9, 10 together, once the ring halves have been mounted onto the flanges. The latch assembly 40 comprises a pair of bosses 41 protruding radially from the side surfaces of one half ring end 9 and supporting a laterally extending pin 42 on which a bolt and nut assembly 43 is pivotally mounted. A second pair of bosses 44 protrude radially from the side surfaces of the other associated half ring end 10. The bolt and nut assemblies engage the bosses 41, 44 to secure the ends 9, 10 together.

Retainer tabs 50, 51 are spaced angularly and protrude radially from the side surfaces of the half rings 5,6 for roughly guiding the half rings into proper position over the outer surfaces 52 of the flanges 3.

Figure 10:
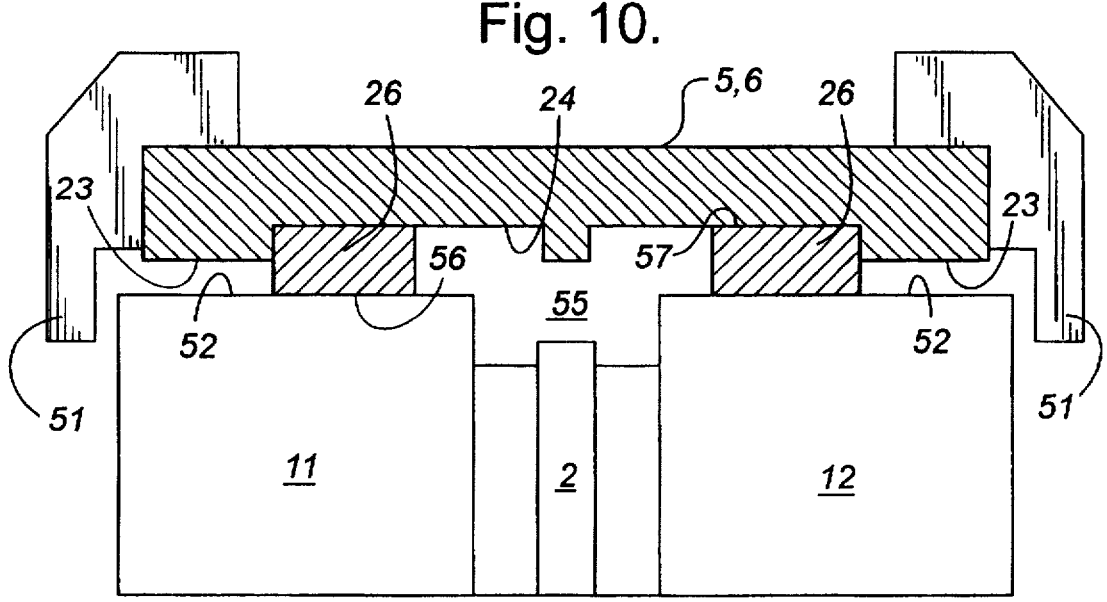
FIG. 10 is a sectional end view of part of the seal and clamp assembly mounted on the flanges of the pipe connection.
Figure 11:
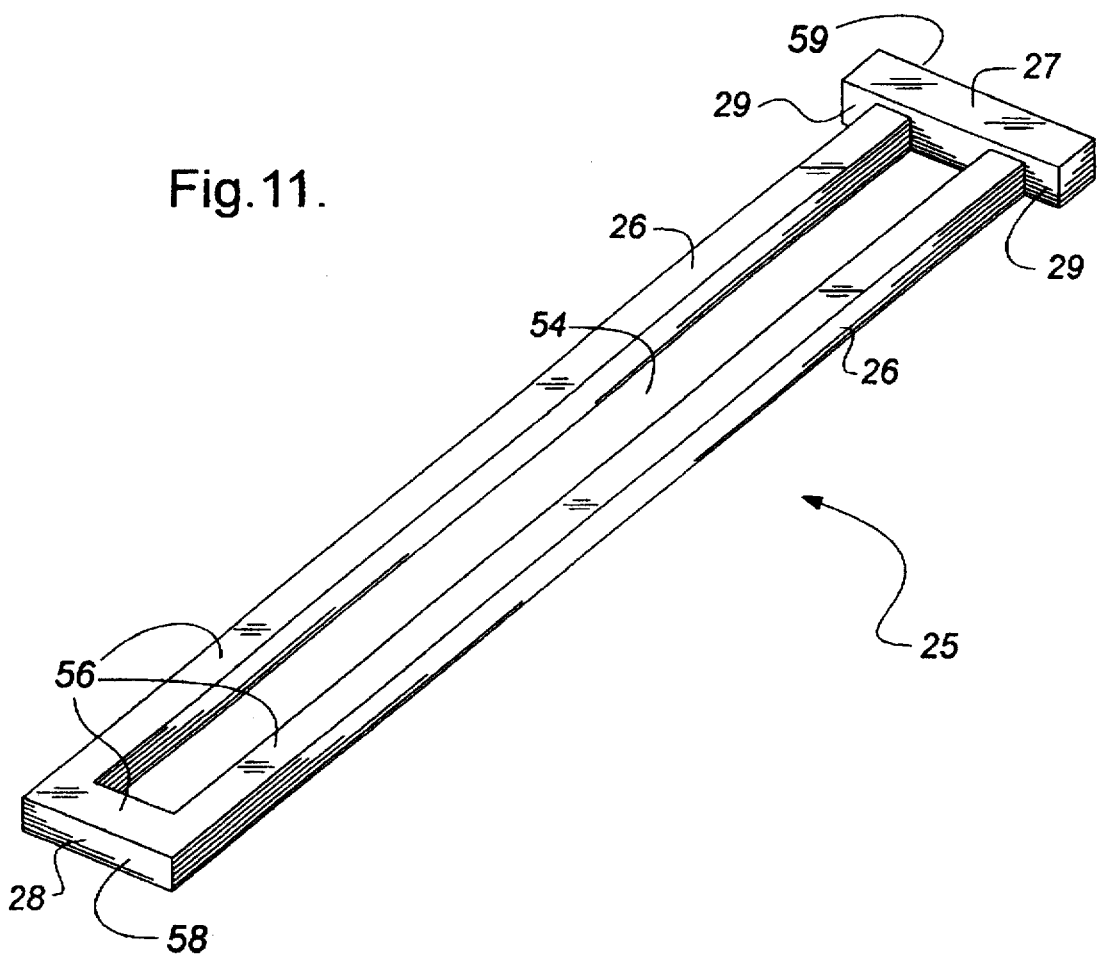
FIG. 11 is a perspective view of the seal element.
Figure 12:
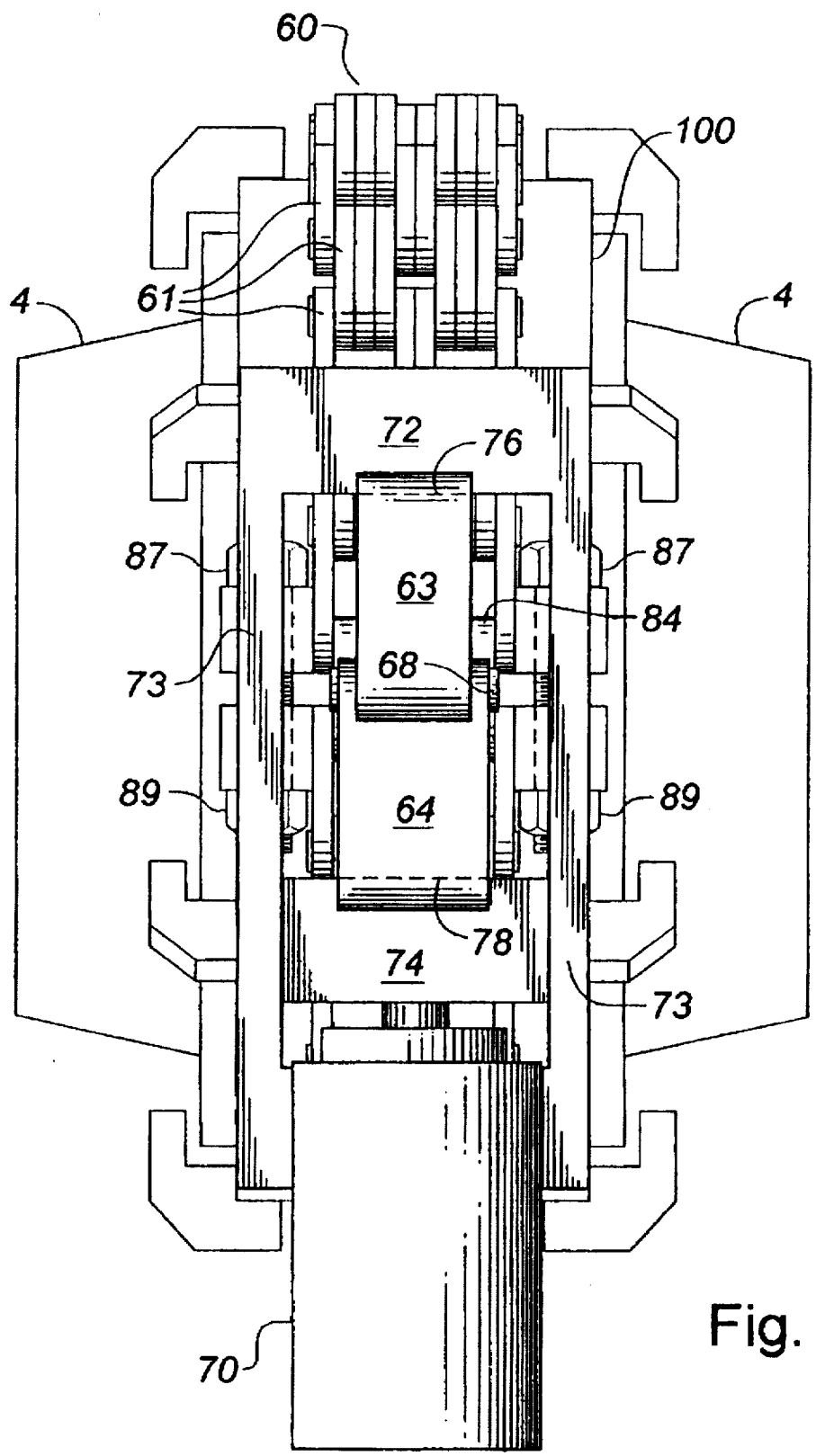
FIG. 12 is a plan view of the clamp device in position having pulled tight the seal and clamp assembly.

In use, the seal elements 25 are seated in the channels 24 of the two hinged ring halves 5,6. The split ring 100 is mounted to the flanges 11, 12 so as to extend therearound, with the inner surface 56 of one side member 26 of each seal element riding on circumferential face or outer surface 52 of one of the flanges, as shown in FIG. 10. The seal elements' central openings 54 are then positioned over the leaking gasket 2 to form a sealed chamber 55.

Figure 5:
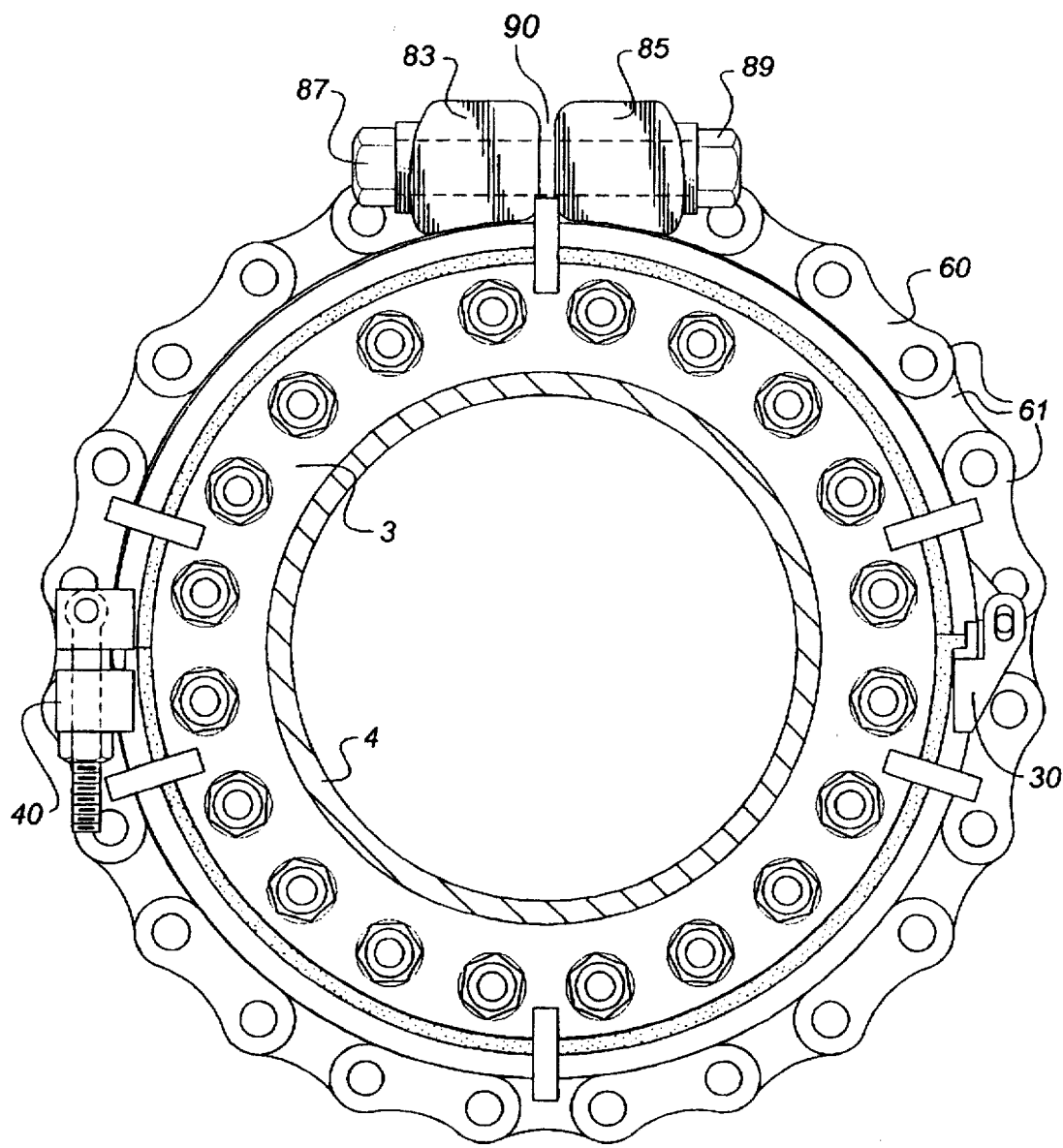
FIG. 5 is an end view, similar to FIG. 4, with the clamp assembly removed.
Figure 6:
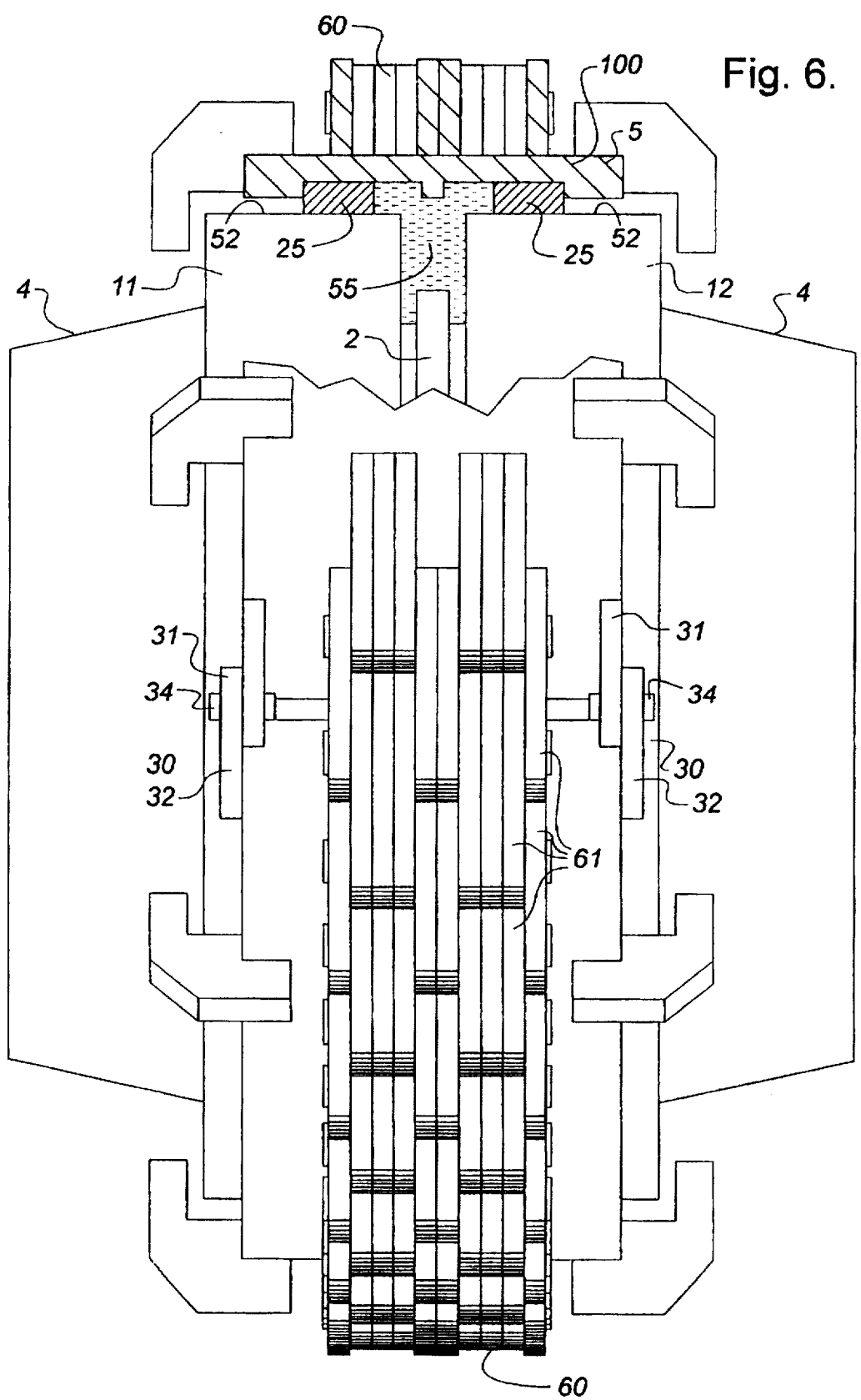
FIG. 6 is a side view of the assembly of FIGS. 4 and 5, partly sectioned to show the seal and clamp assembly in the operating mode.
Figure 7:
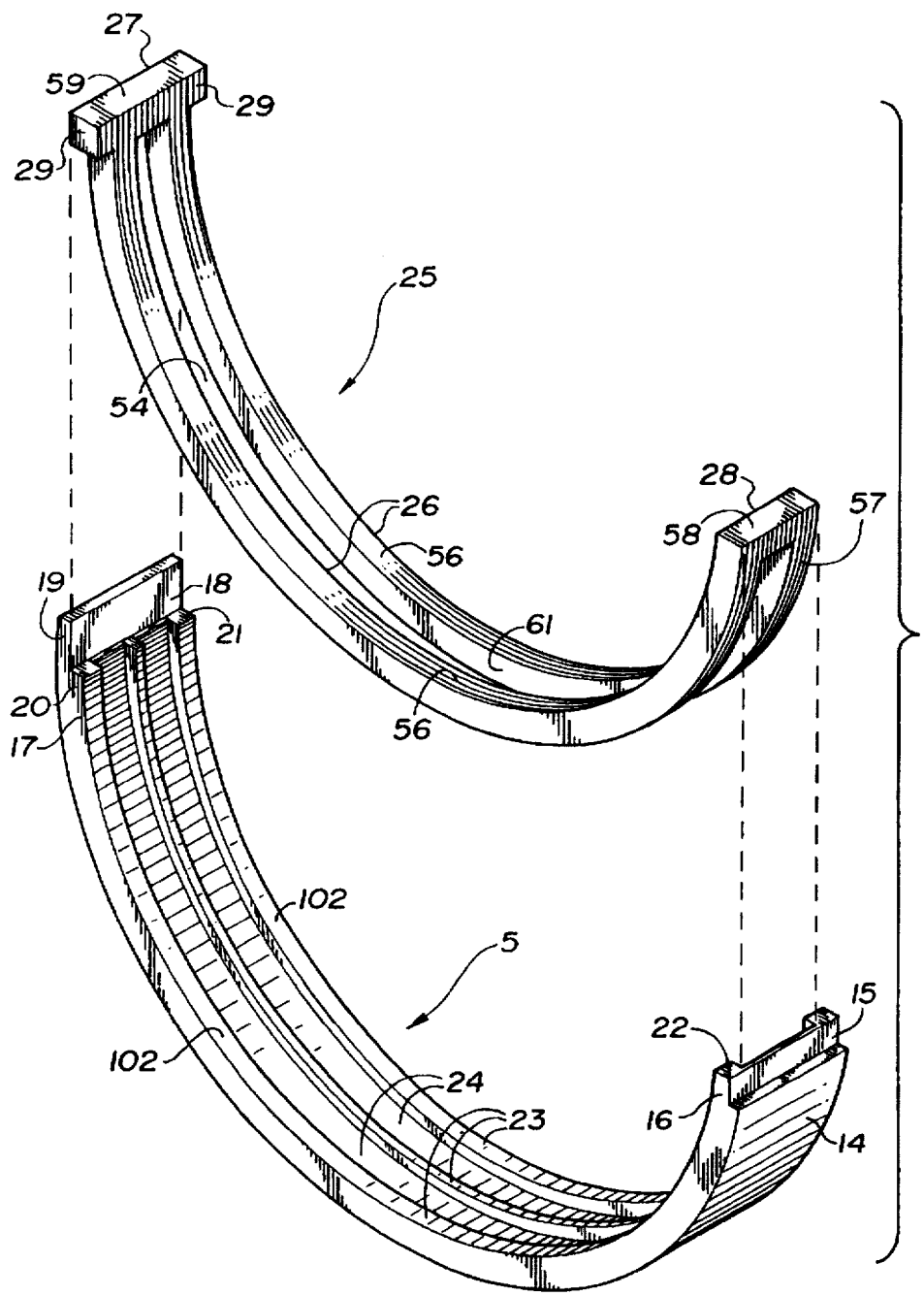
FIG. 7 is an exploded perspective view showing a half ring and associated seal element.
Figure 8:
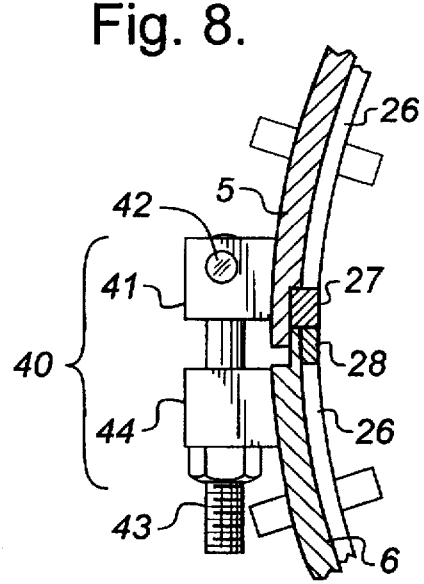
FIG. 8 is a partly sectional end view showing the latch assembly for connecting one pair of ends of the half rings.
Figure 9:
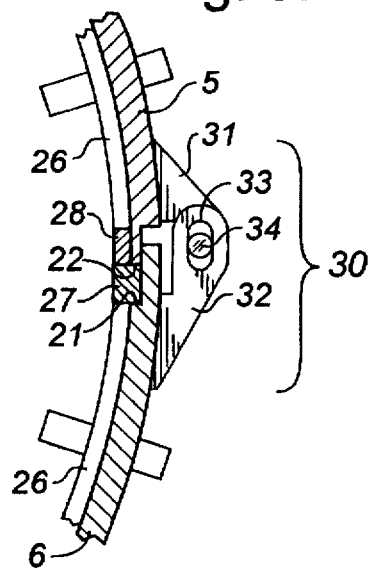
FIG. 9 is a partly sectional end view showing the hinge assembly for connecting the other pair of ends of the half rings.

A belt-like chain and clamp assembly 60 is now provided. The assembly 60 is similar to that described in U.S. Pat. No. 5,123,451. In general it comprises a belt-like chain 61 and a clamp device 62. The clamp device 62 has jaws 63,64 which pivot about a pin 68 at their outer ends and attach to the chain's end links 84,86 at their inner ends 80,82. A hydraulic cylinder 70 is mounted to a stationary plate 72, which holds the back surface 76 of the jaw 63. The cylinder 70 pushes against a movable plate 74, which bears against the back surface 78 of the jaw 64 and which is slidably connected with the stationary plate 72. The cylinder 70 thus biases the jaw 64 toward the jaw 63, thereby cinching the chain 61 tight and contracting the split ring 100. The ends of the chain 61 are then secured together by a bolt 87 and nut 89 connecting bosses 83,85 mounted to the chain ends. See FIG. 5.

As the ring halves 5,6 are pressed to the pipe connection, the following results follow:

the slot 33 and pin 34 of the hinge assembly 30 allow the ring half ends 7, 8 to telescope a small amount;

the two pairs of ring half ends 7,8 and 9,10 telescope to allow the split ring 100 to contract a small amount;

the inner surfaces 56 of the seal elements 25 are pressed against the outer surfaces 52 of the flanges 11,12 and the outer surfaces 57 of the seal elements are pressed against the internal surfaces of the channel 24 to effect a circumferential seal;

the leaking gasket 2 communicates with the sealed chamber 55;

the overlapping half ring ends contract, squeezing the transverse end members 27,28 together to effect a seal at the end faces 58,59 of the abutting seal elements; the opposing pairs of radial faces 21,22 squeeze the transverse end member 27 projecting lugs 29 to effect a seal at the half ring breaks 7,8 and 9,10; and the leakage pressure acts against the inside radial surfaces 61 of the seal elements to intensify their compression and increase their sealing.

The embodiments of the invention in which an exclusive property or privilege is claimed are defined as follows:

1. A seal and clamp assembly for sealing a flanged connection, said connection comprising a pair of flanges bolted together in substantially aligned and opposed relation, each flange having outward facing circumferential faces and radial faces the radial faces having a gasket positioned therebetween at the interface of the flanges, said assembly comprising:

a pair of substantially rigid half rings for circumferentially encircling the flanges, said half rings having a lateral dimension substantially that of the flanged connection and having ends carrying means for securing the ends together to form a split ring having two breaks;

each half ring comprising inner and outer wall portions, each half ring having its outer wall portion at one end and its inner wall portion at the other end recessed so that when the half rings are mounted to the flanges their opposed ends may assume an overlapping relationship and the overlapping ends enable the split ring to be contracted a limited amount;

the inner wall of each half ring having laterally spaced apart side walls forming an internal channel of generally rectangular cross-section extending centrally and circumferentially thereof, each channel side wall at each recessed end forming a transverse shoulder having a radial end face, so that when the half rings are mounted to the flanges they provide a pair of inner, opposed and spaced apart radial end faces at each of the breaks; and a pair of flexible, resilient and annular seal elements, each seal element comprising parallel, coextensive, spaced apart side members of rectangular section and transverse end members, said seal element defining an elongate central opening, one such end member extending laterally beyond the side members to form a pair of laterally protruding lugs, each side member having an inner radial surface, each seal element being dimensioned to seat in the channel of a half ring so that it is closely supported by the channel's inner and side walls but protrudes inwardly therefrom, said seal element lugs being disposed to bear against the half ring's radial end faces, the inner radial surfaces of each seal element being non-constrained and open to pressure originating from the interface of the flanges, so that when the seal elements are positioned in the channels of the two half rings, the half rings are mounted to the flanged connection in the form of a split ring and the ring is contracted about the connection, then the seal elements are pressed against the flange's circumferential faces and seal against them, the flange interface communicates with the seal element central openings and the seal element inner radial surfaces, so that pressure originating from the flange interface acts to squeeze the side members against the flange's circumferential faces, and each lug-forming end member is squeezed by an opposing pair of inner opposed radial end faces to effect seals at the breaks.

2. The assembly as set forth in claim 1 wherein the half rings comprise means for hinging and connecting together one pair of ends, said means comprising boss means projecting outwardly from each end, one such boss means forming slot means, the other boss means having pin means engaging the slot means, whereby said means are operative to hinge and connect the pair of ends together while enabling the split ring to contract a limited amount.

3. The assembly as set forth in claim 2 wherein the half rings comprise means for disengagably latching together the other pair of ends, to secure them together.

4. A seal and clamp assembly sealing a pipeline flanged connection forming part of a pipeline, said connection comprising a pair of flanges bolted together in substantially aligned and opposed relation, each flange having outward facing circumferential faces and radial faces, the radial faces having a gasket positioned therebetween at the interface of the flanges, said assembly comprising:

a pair of substantially rigid half rings circumferentially encircling the flanges, said half rings having a lateral dimension substantially that of the flanged connection and forming a split ring having two breaks, each half ring having a pair of ends;

each half ring comprising inner and outer wall portions, each half ring having its outer wall portion at one end and its inner wall portion at the other end recessed so that the opposed pairs of ends overlap;

the inner wall of each half ring having laterally spaced apart side walls forming an internal channel of generally rectangular cross-section extending centrally and circumferentially thereof;

each channel side wall at each recessed end forming a transverse shoulder having a radial end face, so that the half rings provide a pair of inner opposed radial end faces at each of the breaks; and a pair of flexible, resilient and annular seal elements, each seal element comprising parallel, coextensive, spaced apart side members of rectangular section and transverse end members, said seal element defining an elongate central opening, one such end member extending laterally beyond the side members to form a pair of laterally protruding lugs, each seal element being seated in the channel of one of the half rings and being closely supported on its outer and side surfaces by the half ring, said seal element protruding inwardly from the half ring;

the lug-forming end member of each seal element being disposed in the inner wall portion recess of its associated half ring, so that the end member is bracketed by inner opposed radial end faces; and a chain clamp extending around the split ring and clamping the seal and clamp assembly to the flanged connection so that the seal elements are pressed against the circumferential faces of the flanges, the flange interface communicates with the seal element central openings and each lug-forming end member is squeezed by its bracketing pair of inner opposed radial end faces to effect seals at the breaks.

5. The assembly as set forth in claim 4 wherein the half rings comprise means for hinging and connecting together one pair of half ring ends, said means comprising boss means projecting outwardly from each end, one such boss means forming slot means, the other boss means having pin means engaging the slot means, whereby said means are operative to hinge and connect the pair of ends together while enabling the split ring to contract a limited amount.

* * * * *